Figure 1:
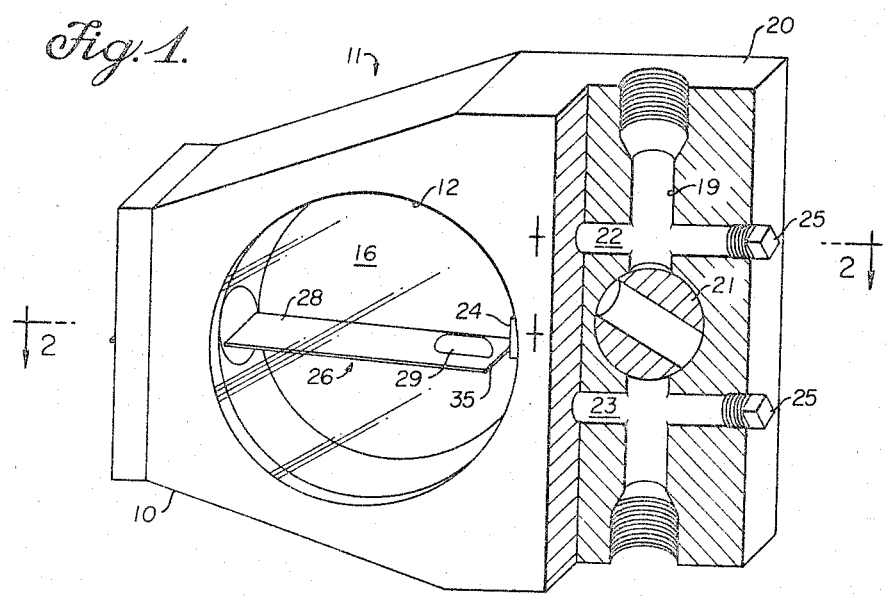

May 16, 1967   F. K. CROSBY ET AL   3,320,381
FLUID FLOW INTERLOCK AND INDICATOR
Filed May 12, 1965

INVENTORS
FORRESTER K. CROSBY
BY WILLIAM F. EATON

ATTORNEY

United States Patent Office 3,320,381
Patented May 16, 1967

3,320,381
FLUID FLOW INTERLOCK AND INDICATOR
Forrester K. Crosby, Moraga, and William F. Eaton, Kensington, Calif., assignors to the United States of America as represented by the United States Atomic Energy Commission
Filed May 12, 1965, Ser. No. 455,354
1 Claim. (Cl. 200—81.9)

The present invention relates to monitors for fluid flow systems and more particularly to an economical but very sensitive device which will detect the fluid flow in a system in order to activate means for sounding an alarm, automatically shutting down the protected equipment, or initiating other corrective action upon a reduction in the fluid flow. The invention described herein was made in the course of, or under, Contract W-7405-eng-48 with the United States Atomic Energy Commission.

Many different fluid systems require monitor devices for the purposes of detecting an unwanted flow reduction. A charged particle accelerator for example, requires numerous such devices for protection of the magnet and other equipment in the event of the failure of cooling water flow. At present there are a number of devices available for such monitoring use but these devices do not fully meet all requirements. For example, the more reliable types are of high cost and may be too expensive for many applications. The devices of lower cost have not been as reliable as desired and have caused many problems.

The present invention therefore is designed to provide a flow monitor of reasonably low cost which will also have good reliability over a reasonably extended period of time. To accomplish this purpose the present invention provides a spring type vane in the path of the moving fluid. A mercury switch bulb mounted on the free end of the vane makes or breaks an electrical contact with a change in flow rate around a certain desired critical flow rate. The shaping of the fluid passage in the region of the vane is uniquely arranged such that the unit is particularly sensitive at the critical flow rate so that a large change in the deflection of the vane is caused by a small change in flow at that particular amount of flow.

Therefore it is an object of the present invention to provide a low cost highly reliable fluid flow monitoring device.

It is a further object of this invention to provide a fluid flow interlock which will operate at a very specific predetermined rate of flow.

It is another object of the present invention to provide a flow monitor which is very sensitive to a flow change at a particular pre-selected flow rate.

It is still another object of this invention to provide a fluid flow interlock which is both reliable and of relatively simple construction.

Figure 2:
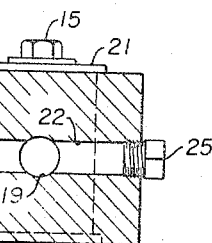
Figure 3:
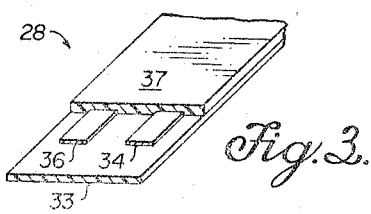

The invention together with further objects and advantages thereof will be best understood by reference to the following specification in conjunction with the accompanying drawing of which:

FIGURE 1 is a perspective view of the interlock, partly cut-away to show internal elements, FIGURE 2 is a staggered section view taken along line 2—2 of FIGURE 1, and FIGURE 3 is a perspective view, partly cut-away, of a portion of a spring vane element of the invention.

Referring now to the drawing and particularly to FIGURES 1 and 2 thereof in conjunction, the flow interlock has a body 11 which is flat and generally rectangular in shape and which may be tapered at one end 10 to reduce bulk and weight. Body 11 is provided with a broad circular bore 12 in one of the broad flat surfaces thereof near the tapered end 10. The bore 12 does not completely penetrate the body 11 but leaves a rear wall 14. A circular glass cover 16 closes the bore 12 to form a flat cylindrical cavity 17 within body 11. A smaller bore 18 penetrates into cavity 17 from the narrow tapered end 10 of the body 11. A fluid flow passage 19 extends through the broader end 20 of body 11 in a direction parallel to the broader surfaces thereof. The passage 19, which does not intercept the cavity 17, is threaded at both ends to connect input and outlet tubing so that the flow which is to be monitored may be transmitted through the passage.

The passage 19 is provided with a valve 21 at its center with which fluid flow through the passage may be regulated or stopped, the valve having a stem 15 projecting outside body 11 so that such adjustments may be conveniently made. Two bores 22 and 23 each penetrate through the passage 19 one on each side of valve 21 and extend to the cavity 17 to direct at least part of the flow therethrough. The proportion of the flow which is diverted through cavity 17 is determined by the setting of valve 21. Bores 22 and 23 both have plugs 25 at their outer ends.

The vane assembly 26 projects into cavity 17 through bore 18 with which it forms a watertight seal. Assembly 26 consists of a base 27, a leaf spring assembly 28 one end of which is secured in the base, and a mercury switch 29 carried on the free end of the spring assembly near the opposite end of cavity 17. As shown in FIGURE 2, switch 29 is of the type having a globule 30 of mercury contained within a capsule 31 and having spaced apart contacts 32 which are electrically connected by the mercury when the capsule is inclined in one direction. When the capsule 31 is tilted in the opposite direction the electrical contact is broken.

Referring now to FIGURE 3, the spring assembly 28 is made up of a backing strip 33 of Fiberglas on which two spaced parallel strips 34 and 36 of beryllium copper spring stock are placed. Strips 34 and 36 are covered by another strip 37 of Fiberglas and the assembly is then cast in epoxy using a vacuum method to obtain penetration. The mercury switch 29 is mounted on the free end of the spring assembly 28 with electrical connections to the switch being made through the strips 34 and 36. As shown in FIGURE 2, the enos of both strips 34 and 36 protrude beyond the Fiberglas strips 33 and 37 and the binding epoxy in order to provide means for electrical connections to the switch.

Referring again to FIGURES 1 and 2, the spring assembly 28 is of a width such that when mounted in place with one end of the vane assembly 26 secured in bore 18, the edges of the spring are very close to the wall 14 of bore 12 and to the cover 16 so that most of the flow is around the free end 35 of the spring. Thus the fluid flow will exert a deflecting force on the spring and the degree of deflection thereof will be dependent on the magnitude of the flow through cavity 17.

To increase the sensitivity of the device to small changes in flow rate, a small rectangular block 24 is secured within cavity 17 adjacent the side thereof which is directly opposite bore 18. Block 24 is spaced only a small distance from the arc swept by the free end of spring vane 28 so that the block acts to restrict the flow passage past the end of the vane when it is at a specific position. Dimensions are so determined that spring 28, as deflected by the flow, approaches block 24 as desired flow conditions are reached. A very slight increase in flow at this particular position of the spring 28 causes the spring to flip oved past the piece 24 as a result of the reduced flow aperture at this point. Such action opens the mercury switch by causing the mercury globule 31 to move to the other end of the switch capsule 31. Through connection of the terminals of the switch 29 to the strips 34 and 36 the two terminals of the switch are carried out of the housing 11 and thus open any exterior circuit which is connected to the strips in order to provide either warning or control means. A small decrease in flow will cause the spring 28 to flip back past the piece 24, closing the switch and any externally connected circuit. Such circuitry, for sounding an alarm, lighting indicator lamps, shutting down equipment, or taking other corrective action, may take a variety of forms known to those skilled in the art. In operation the housing 11 is connected into a fluid flow line, such as the cooling water line of a charge particle accelerator magnet, by connecting to the threaded ends of bore 19, and the valve 21 is adjusted until the switch 29 operates at the desired flow rate in the line. An electrical alarm circuit or control circuit may be connected to the external ends of strips 34 and 36 to either sound an alarm or shut down the equipment in the event of failure of the supply of cooling water. Under normal conditions of flow the spring 28 is held just past the block 24 and the switch 29 is open so that no current flows in the circuit connected to the strips 34 and 36. A relatively small reduction in the fluid flow in the line will cause the spring 28 to return back past the piece 24 and thus close the switch 29 and the externally connected circuit.

If the unit is vertically mounted with fluid flow in at the bottom and out at the top, the undeflected spring vane 28 as installed in the unit has a bend toward the bottom of the bore 12 and is raised against spring tension by fluid flow as herein described. If the interlock is turned over and fluid enters from the top, the mercury switch then is open under conditions of no flow or a low rate of flow and closes when flow rate reaches a certain point. Thus normally open or normally closed circuit conditions may be obtained by selection of the orientation of the interlock and the direction of fluid flow.

Although the invention has been disclosed with respect to a single exemplary embodiment it will be evident to those skilled in the art that many variations are possible within the spirit and scope of the invention. Therefore it is not intended to limit the invention except as defined by the following claim.

What is claimed is:

A fluid flow interlock comprising a body having a cavity therein with parallel sidewalls and spaced apart inlet and outlet means for directing a fluid flow therethrough in a direction parallel to said sidewalls, a valve connecting said inlet and outlet to bypass a selected portion of said fluid flow around said cavity, a flat spring vane disposed in said cavity between said inlet and outlet and having a fixed end and a free end, said vane being sufficiently broad to extend between said cavity sidewalls whereby the fluid flow between said inlet and outlet passes principally around said free end of said vane, a switch attached to said vane near the free end thereof to move therewith, said switch being of a type which is operated by being tilted between two positions, conductor means extending into said body for connecting said switch to external circuitry, and a protuberance disposed on the wall of said cavity between said inlet and outlet and projecting towards said free end of said vane and providing a flow passage around said free end of said vane which is constricted over only a narrow range of motion thereof whereby the motion of said vane relative to change in flow rate is amplified, said switch being operable within said narrow range.

References Cited by the Examiner

UNITED STATES PATENTS

| | | | |
|---|---|---|---|
| 1,574,460 | 2/1926 | Williamson | 200—81.9 |
| 1,830,673 | 11/1931 | Noren | 200—81.9 |
| 2,734,107 | 2/1956 | Reichel | 200—81.9 |
| 2,981,195 | 4/1961 | Payne | 200—81.9 |

BERNARD A. GILHEANY, *Primary Examiner.*

G. MAIER, H. BROOME, *Assistant Examiners.*